Patented Sept. 16, 1952

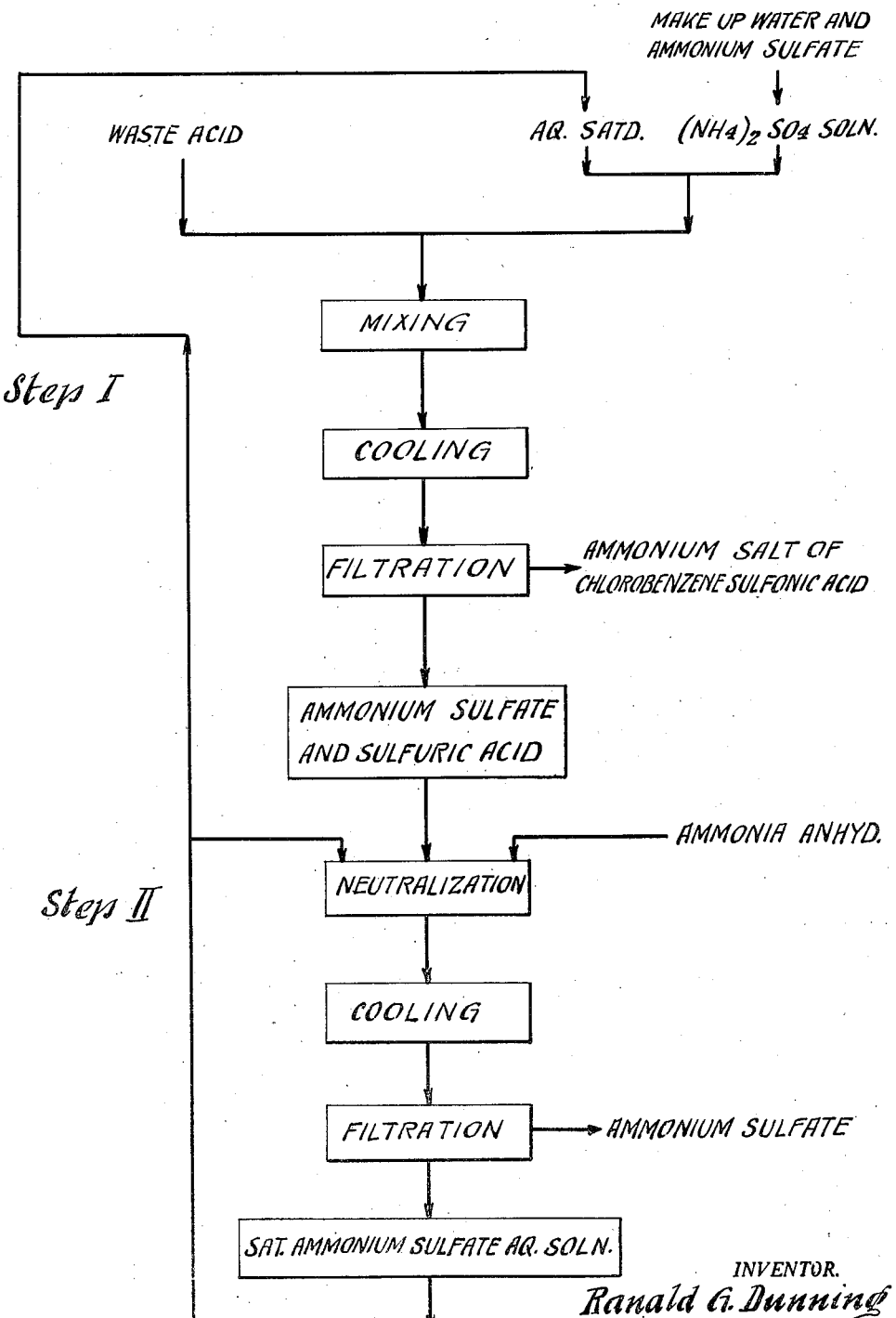

2,610,906

UNITED STATES PATENT OFFICE 2,610,906

AMMONIUM SULFATE RECOVERY

Ranald G. Dunning, Westfield, N. J., assignor to Merck & Co., Inc., Rahway, N. J., a corporation of New Jersey Application June 4, 1948, Serial No. 31,149

5 Claims. (Cl. 23—119)

This invention relates to processes for the recovery of chemical products from factory waste liquors. More particularly it relates to processes for the recovery of sulfuric acid and p-chlorobenzene sulfonic acid from residues obtained in the manufacture of DDT. Sulfuric acid is recovered in the form of ammonium sulfate useful as fertilizer.

In the manufacture of DDT on a commercial scale there is obtained a substantial amount of acidic waste liquors having the following average composition:

65 to 75% by weight of $H_2SO_4$ (100%)
35–25% by weight of p-chlorobenzene sulfonic acid
2% of organic polymers of unknown structure The sulfuric acid as well as the p-chlorobenzene sulfonic acid contained in these liquors are usually lost. Furthermore the disposal of these liquors presents a serious difficulty due to the high acidity of these liquors which require treatment with a neutralizing agent such as lime or the like before discarding them into the sewer.

I have now found that the difficulty in disposing of the waste liquors obtained in connection with the DDT process may be overcome and that the content of sulfuric acid and p-chlorobenzene sulfonic acid can be fully recovered.

In accordance with my invention herein disclosed the waste liquors are first mixed with a saturated aqueous solution of ammonium sulfate (step 1). Any suitable mixing equipment may be used preferably a tank provided with mechanical agitation. The temperature of the mixture will usually reach 100° C. or more. The reaction mixture is then cooled to below 60° C. whereby the p-chlorobenzene sulfonic acid crystallizes out as the ammonium salt almost quantitatively and may be removed by filtration or any other suitable operation. The filtrate containing the sulfuric acid essentially free of the impurities originally present in the waste liquor is then neutralized with gaseous anhydrous ammonia (step 2) whereby the temperature of the mixture rises to above 100° C. After cooling, ammonium sulfate crystallizes out and may be removed. The filtrate, a saturated aqueous solution of ammonium sulfate may be used in the first step of this process, i. e. the precipitation of p-chlorobenzene sulfonic acid. Thus, except for anhydrous ammonia, no other reagents are required for the carrying out of this process. The advantage in the step 2 precipitation lies in the fact that the ammonium chlorobenzene sulfonate is separated prior to crystallization of ammonium sulfate.

When carrying out my process on a commercial scale the saturated solution of ammonium sulfate obtained in step 2 may be recycled and used in step 1. This saturated solution of ammonium sulfate may also be used in the neutralization step with ammonia, to dilute the mixture and to avoid the formation of a thick crystalline mass, which is difficult to handle. While it is advantageous to use 1 part of this saturated solution to 1 part of waste acid in step 1 since the p-chlorobenzene sulfonic acid is least soluble under these conditions, it is preferable to vary the ratio somewhat by using 1 to 2 volumes of saturated solution of ammonium sulfate to 1 volume of waste acid in order to form a precipitate which can be handled by conventional factory equipment. I have found that if the ratio is maintained between 1 part of waste acid to 1 to 2 parts of the saturated solution, the p-chlorobenzene sulfonic acid will be completely precipitated as the ammonium salt, forming an easily workable crystalline mass. This ratio of the saturated solution may be changed if desired to suit the mechanical equipment employed.

The process may be used in a continuous manner. In the diagram, step I represents essentially the treatment with a saturated solution of ammonium sulfate and step II neutralization with ammonia. Both steps are exothermic and it is necessary to use heat exchangers to cool the treated liquors until precipitation occurs. It is also advantageous to adjust the ratio of waste liquor to the saturated solution of ammonium sulfate in such a manner that the precipitation of ammonium p-chlorobenzene sulfonate is substantially complete while the crystalline mass is maintained in the form of a workable slurry. In carrying out the process on a large scale and in a continuous manner it will be advantageous to use an excess of saturated solution of ammonium sulfate (optimum 3.42 to 1 of waste acid). The filtrate obtained after the removal of ammonium sulfate in step 2, can be used advantageously as a diluent in the neutralization with ammonia to minimize the formation of a hard mass. Thus the process requires the use of conventional factory equipment and only anhydrous ammonia is required as an outside reagent. Both components, sulfuric acid and p-chlorobenzene sulfonic acid are recovered without appreciable loss. The ammonium sulfate produced by this process is substantially free from chlorine. The process gives pure ammonium sulfate, suitable for the fertilizer industry, and pure ammonium p-chlorobenzene sulfonate, which can be obtained by recrystallization of the crude salt from hot water.

The following examples illustrate a method of carrying out the present invention, but it is to be understood that these examples are given by way of illustration and not of limitation.

Example 1

105 gr. waste DDT acid and 100 gr. of saturated aqueous $(NH_4)_2SO_4$ solution (1:1 weight ratio) were mixed by pouring the waste acid into the ammonium sulfate solution, under moderate agitation. The reaction temperature reached 112° C. The ammonium p-chlorobenzene sulfonate started to crystallize upon cooling the mixture to 60° C. After cooling down to 25° C., the crystals were filtered off through a sintered glass filter funnel.

The damp cake weighed 63.7 grams, and was only slightly hygroscopic, gaining 1.4 gr. or 2.2% water during 48 hours at room temperature and a relative humidity of 80–100%.

The crude ammonium salt of p-chlorobenzene sulfonic acid (63.7 gr.) was washed with 50 gr. of saturated aqueous ammonium sulfate solution at 25° C. A thin slurry resulted, which was filtered and sucked on vacuum for 10 minutes. The damp cake now weighed 51 gr., which shows a loss of 13.7 grams. The filtrate from the precipitated hydrate, weighing 137.6 gr. (sp. gravity 1.447 at 27° C.), was neutralized with anhydrous ammonia at 40–60° C. No water was added during neutralization, the reaction mixture forming a stiff but still workable slurry of snow-white ammonium sulfate crystals. Beginning at pH 1.8, a brown color (probably due to organic impurities) became evident, and the pH quickly reached 8.5. The slurry was cooled to 25° C. and filtered. Some color came through in the filtrate. The wet cake weighed 101.4 gr., after being firmly pressed and allowed to remain on funnel under vacuum for 10 minutes. Upon drying at 110° C. for 16 hours the dry solid weighed 87.8 gr. It was easily pulverized, had a final very pale cream color and a pleasing aromatic odor. An elemental analysis on a portion of this dried ammonium sulfate showed a content of 0.49% C, 5.13% H and less than 0.2% Cl. These values represent an organic impurity (calculated as the ammonium salt of p-chlorobenzene sulfonic acid) of 1.0 to 1.2% by weight.

Example 2

The assumed composition of the waste acid used in this experiment was the following:

71% $H_2SO_4$
25% p-chlorobenzene sulfonic acid
3.5% $H_2O$
0.5% DDT 645 cc. (1076 grams) of the above waste acid were mixed with 783.6 gr. of a saturated aqueous $(NH_4)_2SO_4$ solution. This corresponded to a 1:1 volume ratio of waste acid and ammonium sulfate.

The temperature of the mixture rose to 116° C. On cooling, ammonium p-chlorobenzene sulfonate started to crystallize out at 65° C. The hygroscopic, sandy-colored flakes were filtered off, weighing 460.7 grams.

This represents a recovery of 0.428 lb. of ammonium-p-chlorobenzene sulfonate per pound of waste acid.

Anhydrous ammonia was bubbled through the filtrate. Ammonium sulfate crystals were formed immediately. Upon agitation, the temperature rose to 87° C. and the batch became so heavy with crystals that it had to be filtered. The pH of the filtrate was 1.0—which indicated that it was strongly acid and far from being neutralized. This filtrate was ammoniated again until it became difficult to handle, due to the thick slurry of crystals formed. The filtrate from this second batch was again acid (pH 2.2), and was ammoniated again until a pH of 9.3 was attained.

The total yield of ammonium sulfate obtained was 0.9 lb. per pound of waste acid.

Example 3

The same amounts of waste acid and ammonium sulfate were used, as in the preceding example. However, the ammonium sulfate solution was made up by using 121.5 grams of the ammonium sulfate cake obtained in the third batch of Example 2. A total of 11.6% of the ammonium sulfate obtained in Example 2 was used as "recycle solution," to be reacted with the waste DDT acid. Considerable foaming occurred on increasing the agitation of the mixture above a certain point. The temperature rose to 112° C. Upon cooling to 25° C., 509.1 gr. of ammonium-p-chlorobenzene sulfonate was obtained in crystalline form. This represents a recovery of 0.463 lb. of ammonium-p-chlorobenzene sulfonate per pound of waste acid used.

Ammonia was bubbled through the filtrate, until a pH of 6.8 was reached. The temperature rose to 82° C. The filtrate in this case was ammoniated completely in one batch, and the crystal slurry formed was so thick that the batch was even more difficult to handle than in Example 2.

A total recovery of 0.940 lb. of ammonium sulfate per pound of waste acid was obtained.

The 1:1 volume ratio of waste acid to ammonium sulfate, although giving the best recovery of p-chlorobenzene sulfonic acid, is not recommended for practical reasons due to the extreme thickness of the ammonium sulfate slurry formed in the ammoniation step. This slurry can be handled only with difficulty, as the batch becomes almost completely solid upon neutralization of the acid with ammonia. Also, a 1:1 ratio would lead to formation of ammonium sulfate-sulfuric acid complexes, instead of pure ammonium sulfate. Therefore, a weight ratio of 3.42:1 (or greater) of saturated ammonium sulfate to spent acid is recommended for practical purposes.

Such a 3.42:1 ratio would give an ammonium sulfate substantially free from occluded $H_2SO_4$ and complex salts, and a slurry which can be easily handled when neutralization is accomplished in one step.

The results of Example 2 and 3 may be summarized as follows:

| | (grams) Spent Acid | (grams) Sulfonate | (grams) $(NH_4)_2SO_4$ | (grams) $NH_3$ reacted | Percent $(NH_4)_2SO_4$ cake for recycle |
| --- | --- | --- | --- | --- | --- |
| Ex. 2 | 1076.0 | 460.7 | 1048.0 | 148.0 | 11.6 |
| Ex. 3 | 1096.7 | 509.1 | 1129.0 | 221.0 | 12.0 |

Yields per pound of waste acid (in lbs.):

|  | Ammonium-p-chlorobenzene sulfonate | dry $(NH_4)_2SO_4$ |
|---|---|---|
| Ex. 2 | 0.428 | 0.900 |
| Ex. 3 | 0.463 | 0.940 |

Modifications may be made in carrying out the present invention without departing from the spirit and scope thereof, and the invention is to be limited only by the appended claims.

I claim:

1. The process for the recovery of ammonium p-chlorobenzene sulfonate and ammonium sulfate from factory waste acid containing p-chlorobenzene sulfonic acid and sulfuric acid, which comprises mixing one volume of said waste acid with at least an equal volume of a saturated aqueous solution of ammonium sulfate, separating the solid ammonium p-chlorobenzene sulfonate precipitated from said mixture, neutralizing the resulting solution with ammonia, and recovering ammonium sulfate from the neutralized solution.

2. The process for the recovery of ammonium p-chlorobenzene sulfonate and ammonium sulfate from the waste sulfuric acid obtained in the manufacture of DDT which comprises mixing one volume of said waste acid with at least an equal volume of a saturated aqueous solution of ammonium sulfate, separating the solid ammonium p-chlorobenzene sulfonate precipitated from said mixture, neutralizing the resulting solution with ammonia, and recovering ammonium sulfate from the neutralized solution.

3. The process for the recovery of ammonium p-chlorobenzene sulfonate and ammonium sulfate from the waste sulfuric acid obtained in the manufacture of DDT which comprises mixing one volume of said waste acid with 1 to 3 volumes of a saturated aqueous solution of ammonium sulfate, separating the solid ammonium p-chlorobenzene sulfonate precipitated from the mixture, neutralizing the resulting solution with ammonia, and recovering ammonium sulfate from the neutralized solution.

4. The process for the recovery of ammonium p-chorobenzene sulfonate and ammonium sulfate in a continuous manner from the waste acid obtained in the manufacture of DDT, which comprises mixing one volume of said waste acid with at least one volume of a saturated aqueous solution of ammonium sulfate, separating the solid ammonium p-chlorobenzene sulfonate precipitated from said mixture, neutralizing the resulting solution with ammonia, recovering ammonium sulfate from the neutralized solution, and recycling the ammonium sulfate mother liquor to precipitate the p-chlorobenzene sulfonate from another batch of waste sulfuric acid liquor.

5. In the process for the recovery of ammonium p-chlorobenzene sulfonate from waste sulfuric acid obtained in the manufacture of DDT, the step which comprises mixing one volume of said waste acid with at least an equal volume of a saturated aqueous solution of ammonium sulfate, and separating the solid ammonium p-chlorobenzene sulfonate precipitated from the mixture.

RANALD G. DUNNING.

REFERENCES CITED

The following references are of record in the file of this patent:

UNITED STATES PATENTS

| Number | Name | Date |
|---|---|---|
| 1,396,320 | Cole | Nov. 8, 1921 |
| 2,022,813 | Ruys | Dec. 3, 1935 |
| 2,035,106 | Vesterdal et al. | Mar. 24, 1936 |
| 2,464,265 | Searle | Mar. 15, 1949 |

OTHER REFERENCES

Ind. and Eng. Chem., pp. 916–922, September 1946, vol. 38, No. 9.